Sept. 11, 1962   L. L. DAVENPORT ET AL   3,053,478

SYSTEM FOR CONTROLLING AND GUIDING MISSILES

Filed Dec. 28, 1945

INVENTORS
LEE L. DAVENPORT
IVAN A. GETTING

BY

ATTORNEY

… … … … … … … …

United States Patent Office 3,053,478
Patented Sept. 11, 1962

3,053,478
SYSTEM FOR CONTROLLING AND
GUIDING MISSILES
Lee L. Davenport, Cambridge, and Ivan A. Getting, Belmont, Mass., assignors, by mesne assignments, to the United States of America as represented by the Secretary of the Navy
Filed Dec. 28, 1945, Ser. No. 637,744
9 Claims. (Cl. 244—14)

The present invention relates in general to the field of radio remote control and more specifically to a system for controlling the maneuvers of a missile in flight providing a high degree of security and freedom from interference.

In a remote control system, a signal indicative of particular control data is transmitted from a control station and received by suitable apparatus in the controlled object. In the present system the controlled object is a missile such as a "buzz" bomb, or a pilotless aircraft or the like, and the signal transmitted and received concerns flight information for maintaining the missile on a predetermined course. As will hereinafter be more completely described, a flight control signal comprises one of several distinct low frequencies, each one when received at the missile being operative to actuate a selective circuit which in turn causes mechanical means to operate one of the missile cnotrols. In a system of this type, it is highly desirable that the information transmitted to the missile be free from the possibility of interference capable of altering the course thereof.

There are available a number of secrecy systems involving the transmission of coded signals which limit the effects of natural interference and which preclude immediate interference from hostile sources. However, these codes are substantially no bar to the latter type of interference if a model of the equipment falls into hostile hands.

It is therefore a specific object of the present invention to provide a remote control transmission system for governing the movements of a distant object which provides maximum security against friendly and hostile interference.

Another object of the present invention is to provide a remote control system utilizing a transmitter of coded pulses and a receiver which has a finite and predetermined response characteristic in the signal circuits thereof.

A further object of my invention is to provide a remote control system which is substantially non-responsive to interfering signals through the combined use of a coded signal having a large number of code possibilities, and a receiver which has a predetermined time delay response characteristic and which is operative at minimum sensitivity consistent with proper signal reception.

Figure 1:
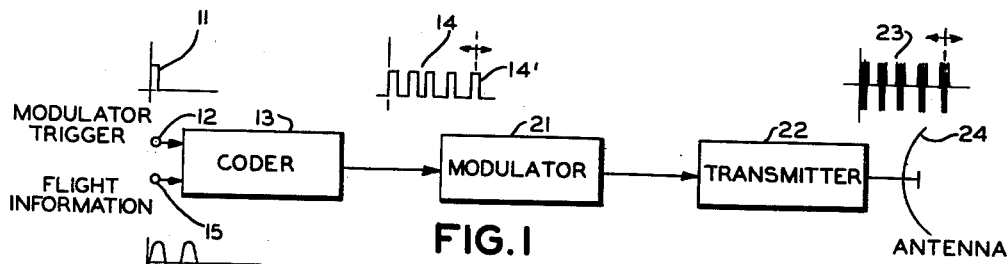
Figure 2:
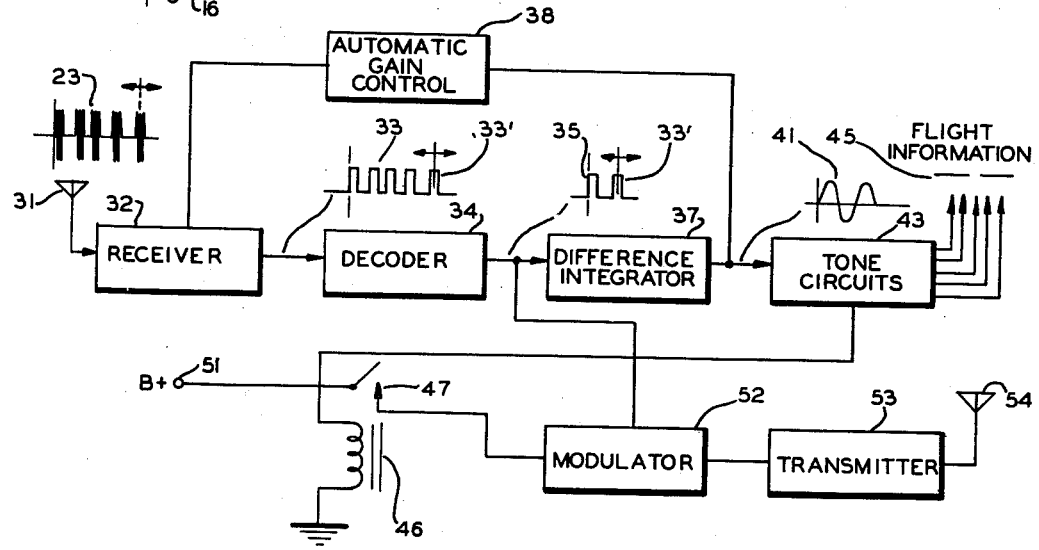

These and other objects of this invention will now become apparent in the following detailed specification taken in connection with the accompanying drawing, in which:
FIG. 1 is a block diagram of the apparatus required at the control station; and
FIG. 2 is a block diagram of the apparatus required in the missile being controlled.

The apparatus for controlling the flight of a missile, such as a "buzz" bomb or an aircraft, required at the ground control station is illustrated in FIG. 1 and reference is now made thereto. In this equipment, a modulator trigger having a substantially rectangular wave form 11 is impressed, at a predetermined repetition frequency, at the input terminal 12 of a coding apparatus 13. For each input pulse 11, the coder output comprises five impulses 14, all five of which are spaced in time and are of a relative duration as determined by a specific, prearranged code.

A modulating, flight control signal 16 comprising preferably one of several low audio frequencies is selected and applied to terminal 15 of the coder 13. The system illustrated utilizes six control frequencies, one of which indicates "on course" and is used when no other control is required. The modulating signal 16 is employed to time modulate the fifth pulse 14' with respect to its pre-set position appearing in the coder output and with respect to the preceding or fourth pulse. Thus the fifth pulse is "jittered" at the modulating flight control frequency.

The time modulating signal 16, as applied to pulse 14' is of course substantially lower in frequency than the repetition rate of the modulating trigger pulse 11.

The coder 13 may be adjusted to space the pulses 14 and 14' so that several hundred code combinations are available. The five output pulses 14 of the coder circuit 13 appearing for each trigger pulse 11 are applied to a modulator circuit 21, and in turn energize a high frequency, high energy transmitter 22, as is well understood in the radar art. The transmitter signal output 23 is radiated by a directional antenna 24 to the missile being controlled.

The apparatus illustrated in FIG. 2 is incorporated at the controlled point, which for the example described comprises a missile controlled from the ground station. With reference to FIG. 2, a receiving antenna 31 picks up the transmitted high frequency pulses of wave form 23 and applies this signal to a receiver 32, the output of which comprises the pulse signal 33 corresponding to the pulse wave form 14 at the transmitter. The fifth pulse of the series is time jittered with respect to the fourth pulse, as previously described, at a frequncy which is determined by the particular information required to guide the course of the missile. The receiver output signal 33 is applied to a decoder 34, which is arranged to provide a single output pulse 35 when the first four pulses of the wave form 33 are received in the order required by the particular adjustment of the decoding circuit 34. Decoding is preferably accomplished by delay lines which cannot be rendered insensitive by an interferring pulse as in the case of multivibrators or similar delay circuits. The output pulse 35 corresponds in time with the fourth pulse of the decoder input signals 33. In addition to the pulse 35, the output includes the time modulated pulse 33'. The pulses 35 and 33' occur at the repetition rate of the modulator trigger 11.

As a security feature, in addition to the coding of the pulses, the decoder 34 is made to respond solely to input signals at the repetition rate of the modulator signal 11 at the transmitter. Further, the modulator 52 may be rendered non-responsive between pulse periods, if signals are received at the correct repetition rate. The time reference pulse 35 and the time modulated pulse 33' are applied to a difference integrator 37 which functions to provide an audio output frequency 41 corresponding to the audio time modulating frequency 16 applied at transmitter terminal 15. As an example, the difference integrator 37 may comprise a coincidence circuit (not shown) which incorporates a pre-set delay equal to the time between the reference pulse 35 and the mean position of the jittered pulse 33'. The coincidence output will be instantaneously proportional to the deviation of the pulse 33' from the mean position thereof thereby producing, when filtered, an audio output 41 at the time modulating frequency. For a more complete description of a difference integrator circuit reference is made to copending application entitled "Communication System," filed November 26, 1945, Serial No. 630,943, now Patent No. 2,677,761.

An automatic gain control circuit 38 utilizing the output signal of the difference integrator 37 is coupled back to the receiver 32 and functions to maintain the sensitivity of receiver 32 at a value no higher than absolutely necessary during the flight of the missile. The sensitivity of the receiver when controlled by the output of difference integrator 37 is affected only by changes in signal level of properly coded and modulated received signals. The use of minimum receiver sensitivity consistent with proper reception is a safeguard against "jamming" inasmuch as it becomes necessary to use a jamming signal at least as strong as the signal transmitted from the ground transmitter FIG. 1 before there is any effect on the missile.

As previously mentioned, the audio signal 16 applied at the transmitter may be one of six prearranged frequencies. At the receiver, the output audio signal 41 of the difference integrator circuit 37 is applied to six parallel tone circuits 43, each being responsive to one of the six frequencies involved. The signal output appearing at any one of five of these tone channels, is applied at 45 to servo-mechanism equipment, not illustrated, which, when energized, results in a maneuver of the missile, as for example, a turn, change in altitude, or the like. The sixth tone transmitted when no maneuvers are desired actuates none of the maneuver servo-mechanisms and permits the missile to proceed on its normal course. If any one of the six established audio frequencies is present in the tone circuit 43, a relay 46 will be actuated, closing contact 47, and applying a positive voltage appearing at terminal 51 to a modulator 52 of a missile beacon reply transmitter 53. When the modulator 52 is thus energized from the positive power source, pulses appearing in the output of the decoder, which of course indicate proper signal reception by the missile, will trigger the modulator circuit 52 and cause the transmitter 53 to generate and radiate from antenna 54 a specific coded reply signal. This coded reply signal when received at the ground control station by apparatus not herein illustrated indicates the position of the missile and proper plotting will indicate the course followed, so that the control information required to provide the missile with an on-target course may be readily determined. The signal generated by transmitter 53 is preferably in a band other than that used for the coded and modulated transmission 23.

In addition to the previously mentioned security precautions of multiplicity of codes permitted by the nature of the transmission, the tone circuits 43 are used to secure still further secrecy. Thus, it has been known that the security obtained in a coded system has been comparatively ineffective if all possible codes were known to one desiring to interfere with the course of the missile. This would occur if a missile were captured. For the receiver illustrated in FIG. 2, in addition to the tone circuits 43 there is provided, by utilizing high-Q filters, for example, a finite delay time between the application of a flight information signal of correct frequency and the response of the modulator 52. This time delay of missile response may be of the order of one second. It is thus evident that if the number of codes available approaches 375, a period of approximately 375 seconds will be required by a hostile source to test all the code combinations.

Summarizing the features of the present invention as described in connection with FIGS. 1 and 2, remote control information is transmitted by a plurality of reference pulse signals, periodically generated at a predetermined frequency. One of these pulses is time jittered or modulated at a frequency which is representative of a flight maneuver or continued operation on course. The received information at the control point is decoded in apparatus which when responsive provides an output signal at the time modulating frequency, operative to change or maintain the course of the missile. In addition, received tone signals energize a beacon reply transmitter causing the transmission of a reply which indicates at the control station the course of flight so that adjustment may be made when required. Freedom from interference, intentional or otherwise, is at a maximum.

It is evident that the remote control system herein described for a missile in flight may be adapted to various other controllable apparatus, as for example, planes or ships. Since these and other modifications of my present invention will be apparent to those skilled in the art, I prefer that this invention be limited by the spirit and scope of the disclosure.

What is claimed is:

1. Remotely controlled apparatus comprising means for periodically receiving a plurality of pulse reference signals of predetermined time spacing and relative duration and a control pulse signal modulated in time with respect to one of said reference pulses at a predetermined frequency, means responsive solely to said predetermined reference pulse signals and said control pulse signal to provide a control signal at said time modulation frequency, and means responsive after a predetermined time delay to said last mentioned control signal.

2. Apparatus for remotely controlling the flight of a missile of the type having flight controls, comprising a control transmitter for periodically generating and transmitting a plurality of pulse reference signals of predetermined time spacing and relative duration followed by a flight control pulse signal modulated in time with respect to one of said reference pulses at a frequency specific to a particular flight maneuver, means in said missile for receiving said pulse reference signals and said time modulated signal, means responsive solely to said predetermined reference pulse signals and said flight control pulse signal to provide a flight control signal at said time modulation frequency, and additional means in said missile responsive to the application of said flight control signal for operating the flight controls of said missile, said last mentioned response being delayed for a predetermined time after said flight control signal application.

3. Apparatus for flight control as described in claim 2, wherein said missile includes a transmitter rendered operative solely upon the application of flight control signals of predetermined frequency, said transmitter when rendered operative transmitting a particular signal upon the reception in said missile of said plurality of pulse reference signals of predetermined time spacing and duration.

4. Apparatus for remotely controlling the flight of a missile having flight controls for altering the attitude of flight, comprising, a control transmitter for periodically generating and transmitting a coded sequence of pulse reference signals of predetermined time spacing and duration followed by a control pulse modulated in time of occurrence with respect to said coded sequence of pulses at a control frequency related to a particular flight maneuver, means in said missile for receiving said pulse reference signals and said time modulated pulse signal, means for decoding received signals occurring in said coded sequence into a single pulse reference signal and a flight control pulse signal modulated in time with respect to said single pulse reference signal, the time modulation of said flight control pulse signal with respect to said single pulse reference signal at the output of said decoding means having a predetermined relationship to the time modulation of the flight control pulse signal with respect to said plurality of pulse reference signals at said control transmitter, and a difference integrator responsive to the output of said decoding means for obtaining a flight control signal at said time modulation frequency.

5. Apparatus of claim 4 and additional means in said missile responsive to said flight control signal at the time modulation frequency for operating said flight controls on said missile.

6. Apparatus of claim 4 and means in said missile responsive to said flight control signal at said time modulation frequency including, a plurality of parallelly connected tone circuits, each of said tone circuits being adapted to pass a signal at a predetermined individual frequency for controlling an individual mechanism, whereby time modulation of said flight control pulse signal at a frequency specific to a particular maneuver and corresponding to the tuned frequency of one of said tone circuits results in the passing of said flight control signal at said time modulation frequency through said last-mentioned tone circuit.

7. Apparatus of claim 4 and an automatic gain control circuit responsive to the output of said difference integrator and coupled back to said receiving means for maintaining the sensitivity of said receiving means at a minimum value for reception of said periodically transmitted plurality of pulse reference signals and said pulse flight signal.

8. Apparatus of claim 4 and means responsive to the output of said decoding means for generating and transmitting a coded reply signal.

9. Apparatus of claim 4 and means responsive to said flight control signal at said time modulation frequency for operating the flight controls of said missile, means responsive to the output of said decoding means for generating and transmitting a coded reply signal, and means responsive to said flight control operating means for rendering said coded reply signal generating means inoperative when said flight control signal deviates from predetermined characteristics.

References Cited in the file of this patent

UNITED STATES PATENTS

| | | |
|---|---|---|
| 1,501,684 | Oswald | July 15, 1924 |
| 1,766,524 | Loftin | June 24, 1930 |
| 2,393,892 | Ganahl | Jan. 29, 1946 |
| 2,412,974 | Deloraine | Dec. 24, 1946 |
| 2,416,330 | Labin et al. | Feb. 25, 1947 |